US 12,432,008 B2

(12) United States Patent
Awoniyi-Oteri et al.

(10) Patent No.: US 12,432,008 B2
(45) Date of Patent: *Sep. 30, 2025

(54) TECHNIQUES FOR MODIFYING PARAMETERS BASED ON ASSISTANCE INFORMATION IN WIRELESS COMMUNICATIONS

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Wooseok Nam, San Diego, CA (US); Linhai He, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,009

(22) Filed: Dec. 20, 2023

(65) Prior Publication Data
US 2024/0129060 A1 Apr. 18, 2024

Related U.S. Application Data

(62) Division of application No. 16/721,641, filed on Dec. 19, 2019, now Pat. No. 12,155,469.
(Continued)

(51) Int. Cl.
H04L 1/00 (2006.01)
H04L 1/1812 (2023.01)
(Continued)

(52) U.S. Cl.
CPC .......... *H04L 1/0026* (2013.01); *H04L 1/1819* (2013.01); *H04L 5/0051* (2013.01);
(Continued)

(58) Field of Classification Search
CPC ... H04L 1/0026; H04L 1/1819; H04L 5/0051; H04L 5/0055; H04L 25/0226; H04W 76/28
See application file for complete search history.

(56) References Cited

U.S. PATENT DOCUMENTS 10,291,376 B2 * 5/2019 Seo ................ H04L 5/0048
2016/0119762 A1 * 4/2016 Zhu ................ H04B 7/0452
370/312
(Continued)

FOREIGN PATENT DOCUMENTS

WO 2017204933 A1 11/2017

OTHER PUBLICATIONS

3GPP TS 36.331: "LTE, Evolved Universal Terrestrial Radio Access (E-UTRA), Radio Resource Control (RRC), Protocol Specification (3GPP TS 36.331, Version 14.2.2, Release 14)", ETSI TS 136 331, V14.2.2, May 2017, 727 Pages, Section 5.6.10.
(Continued)

Primary Examiner — Jason E Mattis
Assistant Examiner — Robert Ma
(74) Attorney, Agent, or Firm — ArentFox Schiff LLP

(57) ABSTRACT

Aspects described herein relate to receiving, by a base station, assistance information to facilitate configuring one or more parameters for communicating by a device with the base station, transmitting, by the base station, a signal that does not include the one or more parameters that are based on the assistance information, detecting, by the base station, a degraded feedback for the signal transmitted to the device, and transmitting, by the base station and based on detecting the degraded feedback, an assistance response signal including one or more parameters based on the assistance information.

20 Claims, 10 Drawing Sheets

Related U.S. Application Data

(60) Provisional application No. 62/783,072, filed on Dec. 20, 2018.

(51) Int. Cl.
*H04L 5/00* (2006.01)
*H04L 25/02* (2006.01)
*H04W 76/28* (2018.01)

(52) U.S. Cl.
CPC ........ *H04L 5/0055* (2013.01); *H04L 25/0226* (2013.01); *H04W 76/28* (2018.02)

(56) References Cited

U.S. PATENT DOCUMENTS

| | | | |
|---|---|---|---|
| 2017/0325277 A1* | 11/2017 | Fujishiro | H04W 4/06 |
| 2019/0349970 A1* | 11/2019 | Chen | H04W 76/27 |
| 2020/0204291 A1 | 6/2020 | Awoniyi-Oteri et al. | |
| 2020/0221394 A1 | 7/2020 | Yoshimura et al. | |
| 2020/0351638 A1* | 11/2020 | Kim | H04W 8/22 |
| 2020/0389847 A1* | 12/2020 | Deng | H04W 52/0219 |

OTHER PUBLICATIONS

ETSI TS 138.331: "5G, NR, Radio Resource Control (RRC), Protocol Specification (3GPP TS 38.331 Version 15.4.0 Release 15)", Technical Specification, 3rd Generation Partnership Project, Mobile Competence Centre, 650, Route Des Lucioles, F-06921 Sophia-Antipolis Cedex, France, vol. RAN WG2. No. V15.4.0 (Apr. 2019), Jan. 14, 2019, XP051591713, 471 Pages, Section 5.3.3, Section 5.7.4.

Huawei, et al., "Power Saving Techniques," 3GPP Draft, 3GPP TSG RAN WG1 Meeting #95, R1-1812231, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051554103, 7 pages, the whole document,paragraphs [02.2], [02.3], [02.4],figure 2.

International Preliminary Report on Patentability—PCT/US2019/068058 the International Bureau of WIPO—Geneva, Switzerland, Jul. 1, 2021.

International Search Report and Written Opinion—PCT/US2019/068058—ISA/EPO—Mar. 23, 2020.

Samsung: "Triggering Adaptation Schemes", 3GPP TSG RAN WG1 Meeting #95, R1-1813012 Triggering Adaptation Schemes, 3rd Generation Partnership Project, Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018, XP051554990, 9 Pages, pp. 1 to 4, 9 and Tables 2 to 3.

Sony: "Conditions and Procedures for Adaptation of Power Consumption Characteristics", 3GPP Draft, 3GPP TSG RAN WG1 Meeting #95 R1-1812750—Conditions and Procedures for Adaptation UE Power V3, 3rd Generation Partnership Project, Mobile Competence Centre, 650, Route Des Lucioles, F-06921 Sophia-Antipolis Cedex, vol. RAN WG1, No. Spokane, USA, Nov. 12, 2018-Nov. 16, 2018, Nov. 11, 2018, XP051554708, 6 pages, pp. 3-4,3.Conditions for adaptationpp. 4-5, 4.Procedure for adaptation figure 3.

\* cited by examiner

TECHNIQUES FOR MODIFYING PARAMETERS BASED ON ASSISTANCE INFORMATION IN WIRELESS COMMUNICATIONS

CLAIM OF PRIORITY UNDER 35 U.S.C. § 119

The present Application for Patent is a divisional application of application Ser. No. 16/721,641, entitled "TECHNIQUES FOR MODIFYING PARAMETERS BASED ON ASSISTANCE INFORMATION IN WIRELESS COMMUNICATIONS" filed Dec. 19, 2019, which claims priority to Provisional Application No. 62/783,072, entitled "TECHNIQUES FOR MODIFYING PARAMETERS BASED ON ASSISTANCE INFORMATION IN WIRELESS COMMUNICATIONS" filed Dec. 20, 2018, which are assigned to the assignee hereof and hereby expressly incorporated by reference herein for all purposes.

BACKGROUND

Aspects of the present disclosure relate generally to wireless communication systems, and more particularly, to utilizing device assistance information.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, devices (e.g., user equipment) can send assistance information to other nodes that schedule communications with the other nodes (e.g., base stations) to allow the other nodes to modify communication parameters based on the assistance information received from the devices. The other nodes (e.g., base stations), however, may not be obligated to modify the parameters based on the assistance information, which may cause undesirable side effects at the devices, such as consumption of power when the battery may have less than a threshold remaining capacity.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes transmitting, by a device and to a base station, assistance information to facilitate configuring one or more parameters for communicating with the base station, detecting, by the device, that an assistance response signal including the one or more parameters based on the assistance information is not received from the base station within a threshold period of time, and degrading, by the device and based on the detecting that the assistance response signal is not received within the threshold period of time, feedback to be communicated to the base station.

In another example, a method for wireless communications is provided. The method includes receiving, by a base station and from a device, assistance information to facilitate configuring one or more parameters for communicating with the base station, detecting, by the base station, a degraded feedback for a signal transmitted to the device that does not include the one or more parameters based on the assistance information, and transmitting, to the device and based on detecting the degraded feedback, an assistance response signal including one or more parameters based on the assistance information.

In another example, an apparatus for wireless communication is provided that includes a transceiver, a memory configured to store instructions, and one or more processors communicatively coupled with the transceiver and the memory. The one or more processors are configured to transmit, to a base station, assistance information to facilitate configuring one or more parameters for communicating with the base station, detect that an assistance response signal including the one or more parameters based on the assistance information is not received from the base station within a threshold period of time, and degrade, based on the detecting that the assistance response signal is not received within the threshold period of time, feedback to be communicated to the base station.

In yet another example, an apparatus for wireless communication is provided that includes a transceiver, a memory configured to store instructions, and one or more processors communicatively coupled with the transceiver and the memory. The one or more processors are configured to receive, from a device, assistance information to facilitate configuring one or more parameters for communicating with the base station, detect a degraded feedback for a signal transmitted to the device that does not include the one or more parameters based on the assistance information, and transmit, to the device and based on detecting the degraded feedback, an assistance response signal including one or more parameters based on the assistance information.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
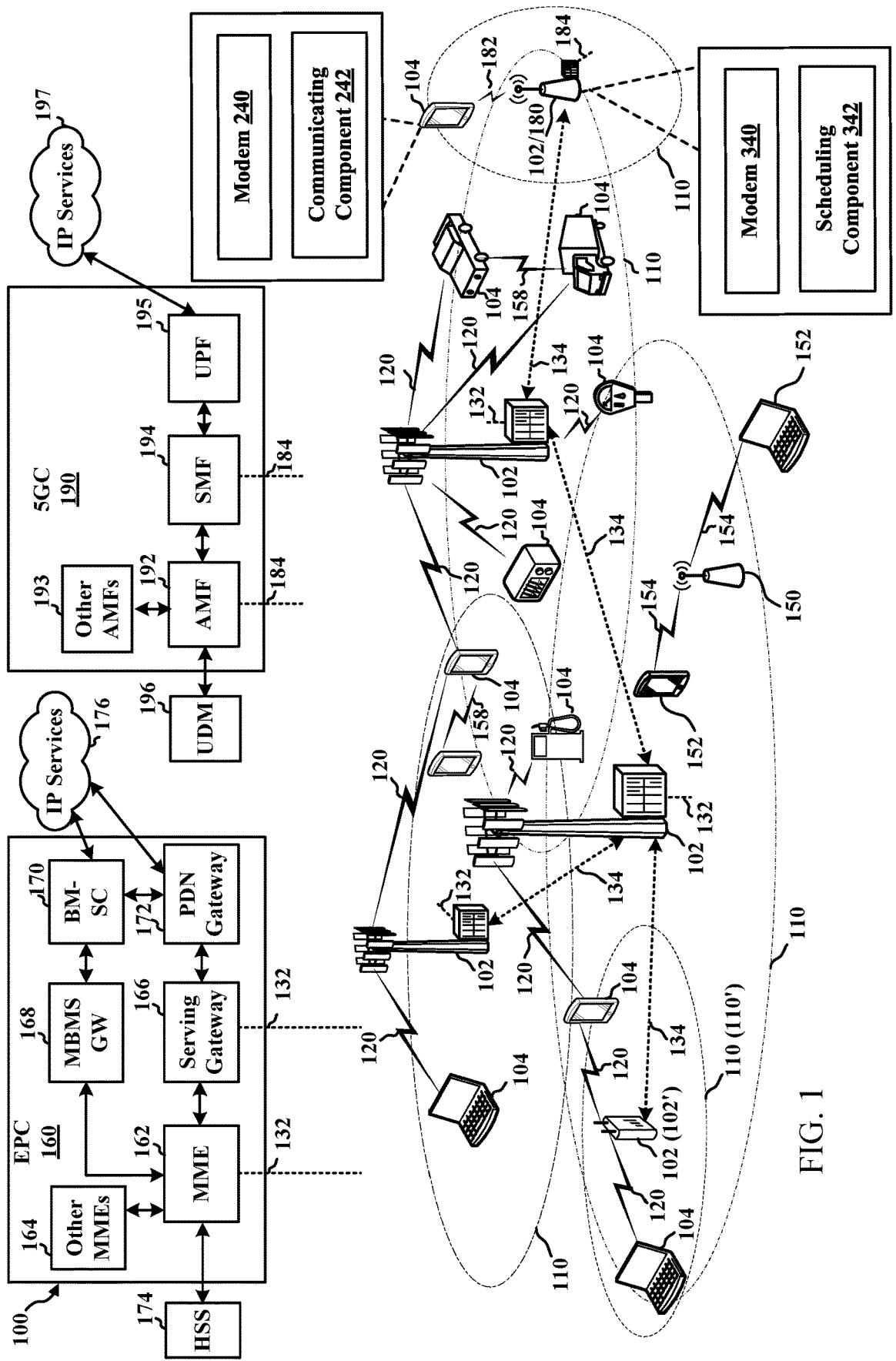
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to modifying communication parameters based on device assistance information. For example, the assistance information can include recommended parameter values communicated by a first device (e.g., a user equipment (UE)) to a second device (e.g., a base station) to facilitate wireless communications therewith. The first device may provide the assistance information to the second device for various reasons, such as to cause the second device to schedule or otherwise modify communication parameters associated with the first device. For example, the first device may recommend parameter values in certain scenarios, such as to conserve power or resources at the first device. The assistance information may include parameter values such as a number of antennas used by the first device for communicating with the second device, discontinuous receive (DRX) parameter values, control channel (e.g., physical downlink control channel (PDCCH)) monitoring values, and/or the like. The second device can accordingly adjust the communication parameters for the first device, and in one example, can send an assistance response signal to the first device, where the assistance response signal can be a signal that includes an indication that the communication parameters have been or are being modified.

When the first device, such as a UE, transmits assistance information (referred to herein as UE assistance information (UAI)), the second device, such as a base station, receiving the UAI and scheduling the UE for communications may not be obligated to modify communication parameters based on the UAI. Not modifying the parameters may cause the device to enter in an undesirable state, such as a state where the device consumes more power than desired in communicating with the base station (e.g., when the device is in a low battery state). In such cases, the device may desire to inform or otherwise motivate or cause the base station (or underlying network components) to modify the communication parameters, which may be based on the provided UAI. In this regard, for example, the device can operate using a degraded feedback process, which the base station can detect and use to determine to modify the communication parameters based on previously received UAI.

In one specific example, the device can degrade the feedback by refraining from transmitting the feedback until an assistance response signal, which can modify the communication parameters in view of the UAI, is received. For example, the feedback may include hybrid automatic repeat/request (HARQ) feedback, channel quality indicator (CQI) reports, and/or the like. In one example, the device can detect a signal received from the base station after sending the UAI and before receiving a corresponding assistance response signal. In this example, the device can refrain from transmitting HARQ feedback for the signal until the assistance response signal is received, or until a maximum number of retransmissions of the signal is reached. In another example, the device can degrade the feedback by transmitting non-acknowledgement (NACK) feedback for the signal (e.g., regardless of whether the signal is properly received and decoded) until the assistance response signal is received, or until a maximum number of retransmissions of the signal is reached. In yet another example, the device can degrade the feedback by sending other signals to the base station where the assistance response signal is not received, such as a sounding reference signal (SRS), scheduling request (SR), the UAI, a power status signal, or other signals, which may include the UAI.

In another example, the device can degrade the feedback by refraining from sending CQI reports and/or sending CQI reports with degraded CQI values for a period of time until the assistance response signal is received. This may cause the base station to not schedule data signals to the device until the communication parameters are adjusted based on the UAI, or may cause limited downlink data transmission to the device. In any case, in one example, the base station may detect the degraded feedback and can determine, based on the degraded feedback and the outstanding UAI, that the device is sending the degraded feedback for the purpose of requesting that the UAI be considered and used to adjust communication parameters. The base station can accordingly adjust the communication parameters based on the UAI. The base station may also make this determination based on detecting the degraded feedback and evaluating channel quality metrics to determine whether the channel quality could cause the degraded feedback. If the channel quality is of a threshold quality, for example, the base station may determine the device is degrading the channel quality report to request that the UAI be considered and can use the degraded channel quality report to adjust communication parameters. In any case, the device can accordingly motivate or cause the base station to adjust communication parameters based on a provided UAI in certain circumstances.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for providing assistance information (e.g., UAI) and/or communicating degraded feedback, and some nodes may have a modem 340 and scheduling component 342 for receiving assistance information (e.g., UAI) and configuring devices with associated communication parameters, as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can send UAI to one or more base stations 102 serving the UE 104 to assist in setting communication parameters for the UE 104. Scheduling component 342 of the base station 102 can receive the UAI and may not be obligated to set corresponding communication parameters. As described further herein, where the base station 102 does not adjust the communication parameters for the UE 104 based on the UAI, communicating component 242 can degrade feedback to be transmitted to the base station 102, which may cause scheduling component 342 to adjust the communication parameters for the UE 104 based on the previously received UAI. For example, communicating component 242 can degrade the feedback by at least one of refraining from transmitting the feedback, transmitting degraded values for the feedback, etc.

Turning now to FIGS. 2-10, aspects are depicted with reference to one or more components and one or more methods that may perform the actions or operations described herein, where aspects in dashed line may be optional. Although the operations described below in FIGS. 4-9 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
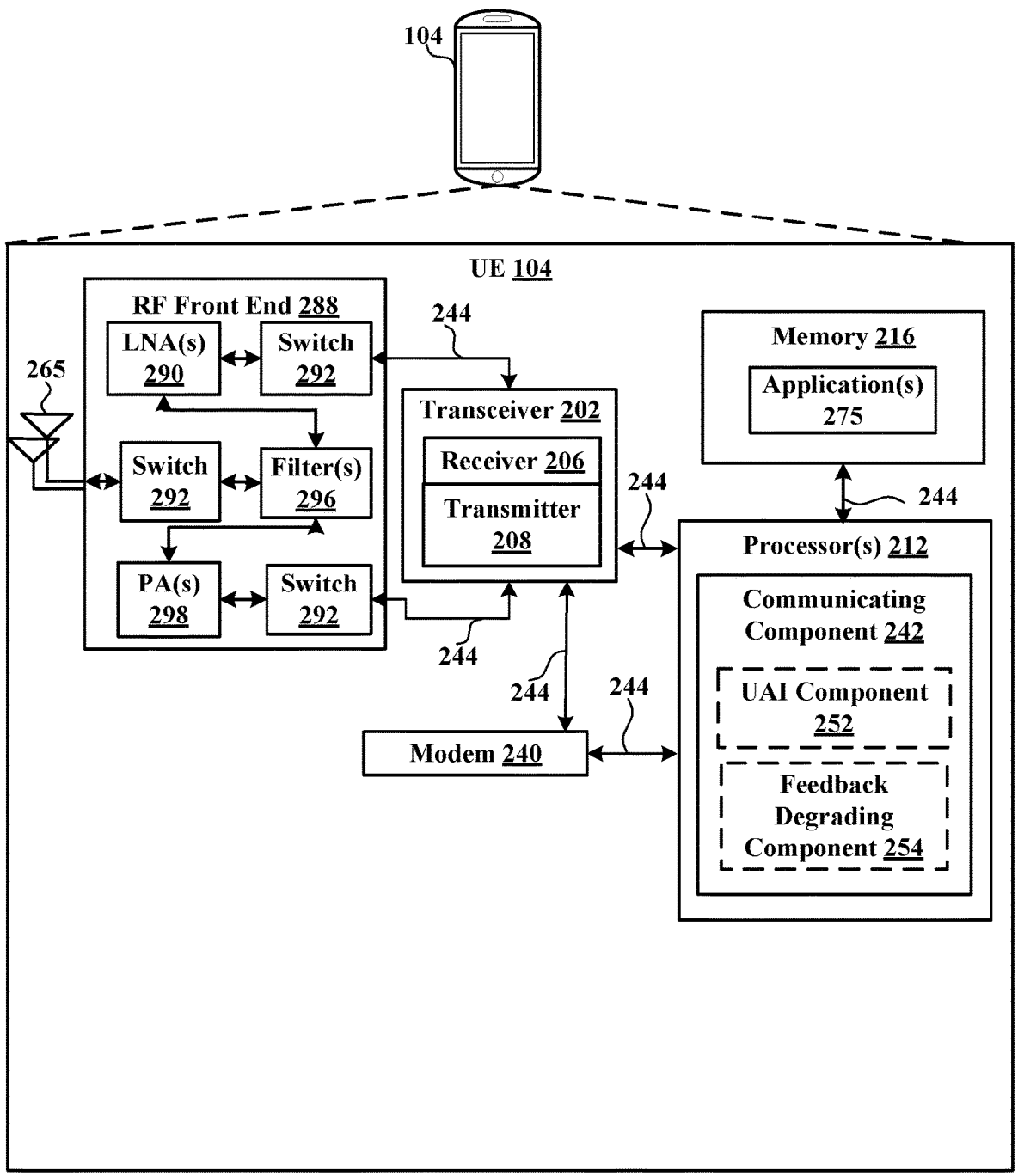
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 to transmit UAI and/or degrade feedback for one or more signals.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a UAI component 252 for generating and reporting UAI to one or more base stations 102 for use in modifying one or more communication parameters for the UE 104 and/or a feedback degrading component 254 for degrading feedback for one or more signals where a response to the UAI (e.g., an assistance response signal with one or more communication parameter adjustments) is not received.

In an aspect, the processor(s) 212 may correspond to one or more of the processors described in connection with the UE in FIG. 10. Similarly, the memory 216 may correspond to the memory described in connection with the UE in FIG. 10.

Figure 3:
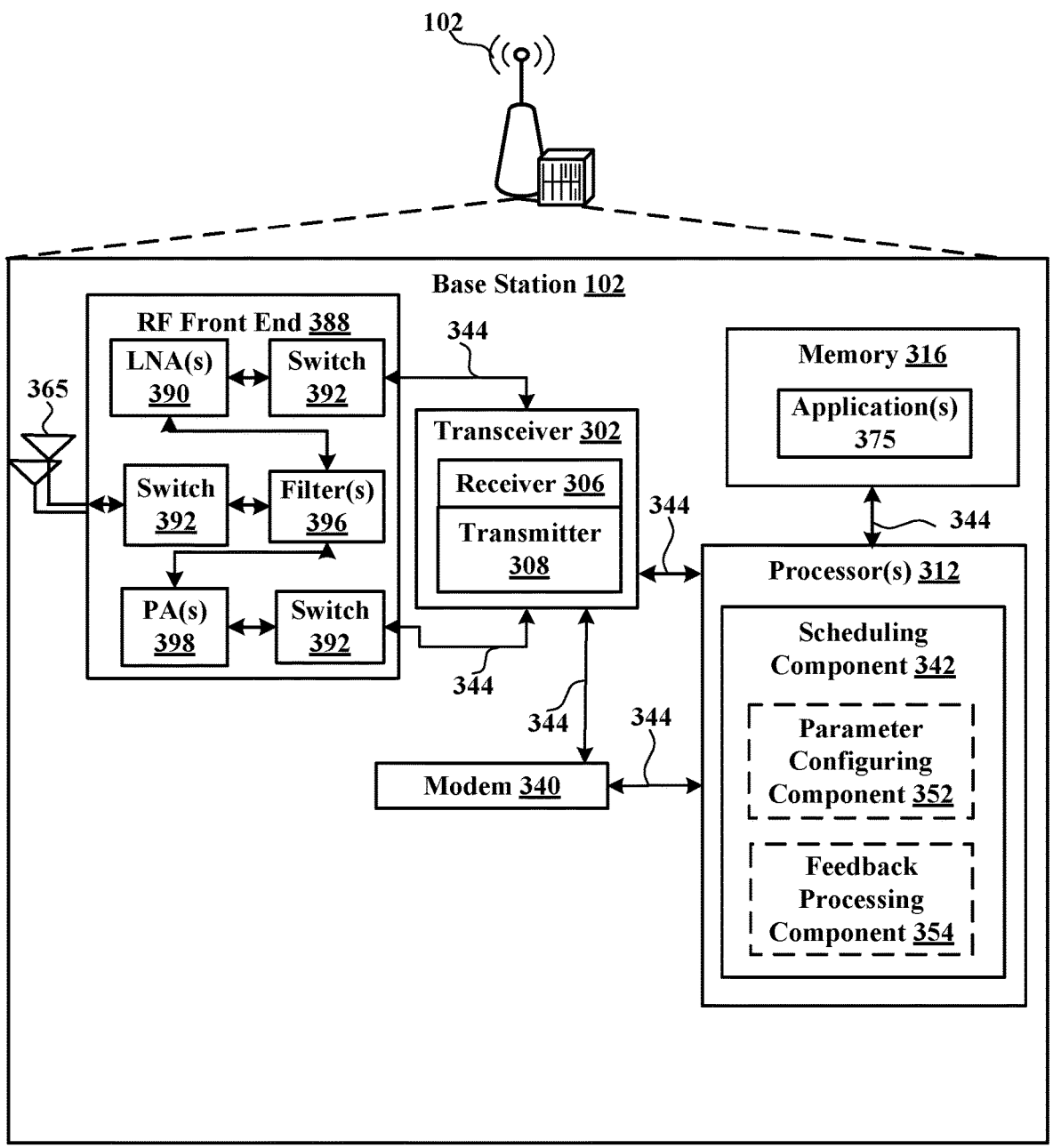
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for receiving UAI and/or adjusting communication parameters for a corresponding UE 104.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a parameter configuring component 352 for configuring communication parameters for a UE, which may be based on received UAI, and/or a feedback processing component 354 for processing feedback for one or more signals that is received (or not received) from the UE.

In an aspect, the processor(s) 312 may correspond to one or more of the processors described in connection with the base station in FIG. 10. Similarly, the memory 316 may correspond to the memory described in connection with the base station in FIG. 10.

Figure 4:
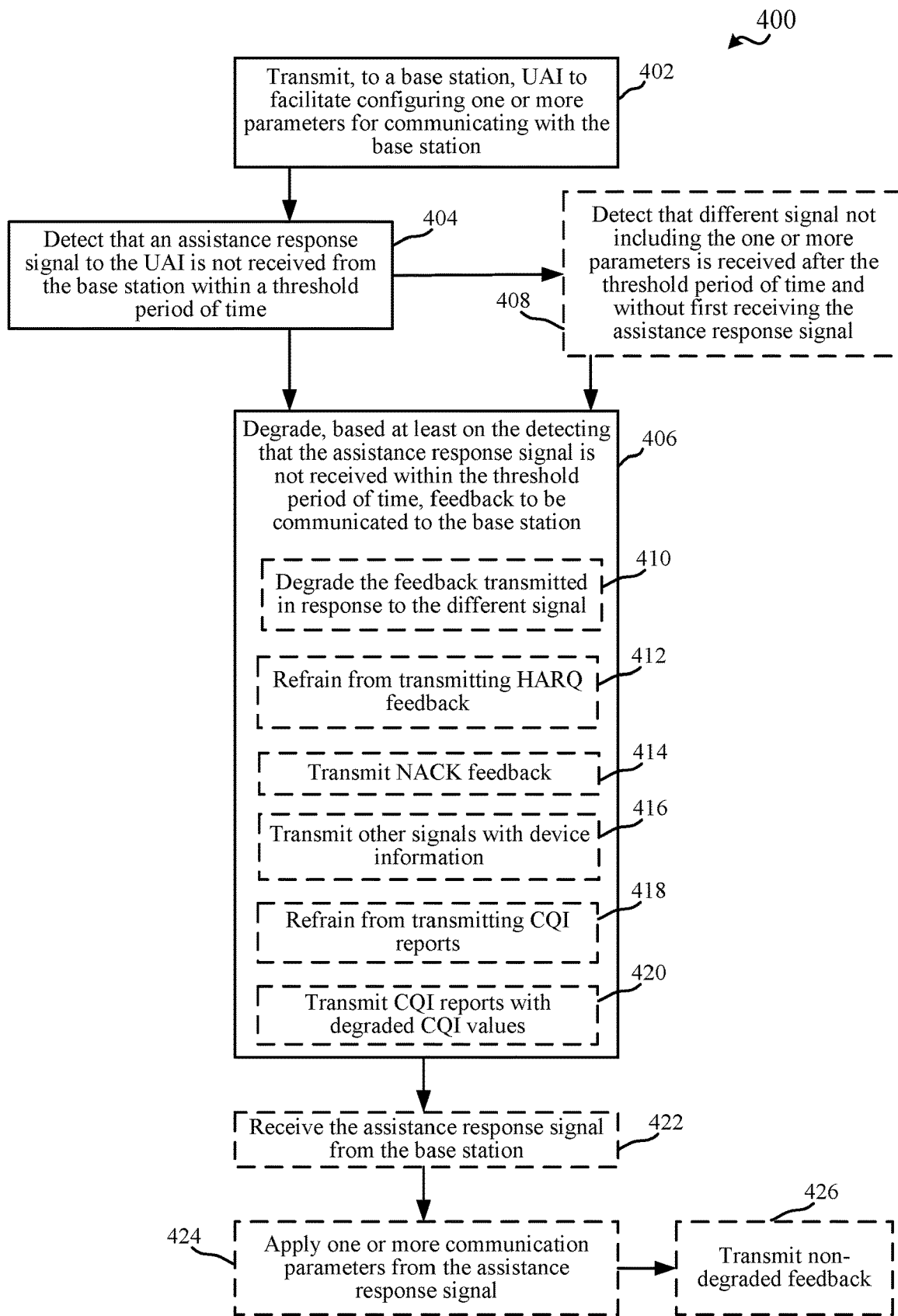
FIG. 4 is a flow chart illustrating an example of a method for degrading feedback, in accordance with various aspects of the present disclosure.

FIG. 4 illustrates a flow chart of an example of a method 400 for degrading feedback based on not receiving an indication of communication parameter adjustment or other signals in response to reported UAI. In an example, a UE 104 can perform the functions described in method 400 using one or more of the components described in FIGS. 1-2.

In method 400, at Block 402, UAI can be transmitted, to a base station, to facilitate configuring one or more parameters for communicating with the base station. In an aspect, UAI component 252, e.g., in conjunction with processor(s) 212, memory 216, transceiver 202, communicating component 242, etc., can transmit, to the base station, UAI to facilitate configuring one or more parameters for communicating with the base station (e.g., base station 102 and/or other base stations in the network). For example, the UAI can assist the base station in configuring one or more parameters for the UE 104 to use in communicating with the base station 102. For example, UAI component 252 can transmit the UAI as part of establishing a connection with the base station 102 (e.g., in a random access channel (RACH) signal, in another signal once communications are established with the base station 102, and/or the like. For example, the UAI can be sent in a signal configured for UAI notifications.

In an example, UAI can include UEAssistanceInformation as defined and described in third generation partnership project (3GPP) technical specification (TS) 36.331, section 5.6.10. For example, the UAI may include power saving preferences of the UE 104, such as a number of antennas supported by the UE 104, one or more discontinuous receive (DRX) parameters (such as a supported or desired DRX cycle length), one or more control channel (e.g., physical downlink control channel (PDCCH)) monitoring parameters, semi-persistent scheduling (SPS) assistance information, maximum shared channel (e.g., physical downlink shared channel (PDSCH) and/or physical uplink shared channel (PUSCH) bandwidth configuration preferences, overheating assistance information, link delay budget report, and/or the like. The base station 102 can use the UAI to configure resources over which the UE 104 can receive signals from the base station 102, resources over which the UE 104 can transmit signals to the base station 102, DRX scheduling parameters, and/or the like.

As previously described, the base station 102 may not be obligated to adjust the communication parameters to recommended values indicated in UAI messages and/or may not be obligated to respond to the UAI messages transmitted by UEs with assistance response signals indicating modified communication parameters based on the UAI. Where the base station 102 does not respond, in this regard, it may lead to undesirable consequences at the UE 104, such as running out of battery life (e.g., supporting more demanding communication parameters when the battery life at the UE 104 is below a threshold). In this regard, for example, where the base station 102 does not respond to the received UAI with an assistance response signal in this regard, it may be beneficial for the UE 104 to take certain actions to motivate the base station 102 (or underlying network) to modify the communication parameters based on the UAI, so that the UE 104 does not experience undesirable conditions.

In method 400, at Block 404, it can be detected that an assistance response signal to the UAI is not received from the base station within a threshold period of time. In an aspect, UAI component 252, e.g., in conjunction with processor(s) 212, memory 216, transceiver 202, communicating component 242, etc., can detect that the assistance response signal to the UAI is not received from the base station within the threshold period of time. For example, an assistance response signal may include a signal that may indicate the one or more parameters adjusted based on the UAI. For example, the assistance response signal can include a signal received from the base station 102 as (or part of) a RACH response message (e.g., in response to the UAI transmitted in a RACH response message) or in another message (e.g., over a control channel) where communications are established with the UE 104. The assistance response signal may include an indication of an adjustment for one or more communication parameters that are based on the received UAI, where the indication may include an indication that the one or more communication parameters are adjusted (e.g., a binary value or other indication of adjustment), which may include a value for each of one or more communication parameters or a value representative of all of the one or more communication parameters. In another example, the indication can include a list of the adjusted communication parameter(s), associated adjustment values, and/or the like. Where it is detected that this signal is not received, however, this may cause the UE 104 to degrade feedback, as described further herein.

Detecting that the assistance response signal is not received, for example, may include the UAI component 252 determining that a period of time expires (e.g., from transmitting the UAI) before an assistance response signal is received. During this period of time, other signals may or may not be received from the base station 102, but the UE 104 can degrade feedback, as described herein, until the assistance response signal is received. In another example, detecting that the assistance response signal is not received, for example, may include the UAI component 252 determining that another signal that is not an assistance response signal (e.g., a signal such as a different control signal or data signal that does not include associated communication parameter adjustment indications) is received before an assistance response signal. In this example, the UE 104 can similarly degrade feedback, as described herein, until the assistance response signal is received.

In method 400, at Block 406, feedback to be communicated to the base station can be degraded based on detecting that the assistance response signal is not received within the threshold period of time. In an aspect, feedback degrading component 254, e.g., in conjunction with processor(s) 212, memory 216, transceiver 202, communicating component 242, etc., can degrade, based on the detecting that the assistance response signal is not received within the threshold period of time, feedback to be communicated to the base station. For example, feedback degrading component 254 can degrade the feedback by refraining from transmitting the feedback, transmitting degraded values for the feedback, etc., and may do so until the assistance response signal is received, until a number of retransmissions has occurred at the base station 102, and/or the like. As described, in one example, the degraded feedback can be an indication to the base station 102 to adjust communication parameters of the UE 104 based on the UAI and send a corresponding assistance response signal.

In one example, feedback degrading component 254 can transmit the degraded feedback based on UAI component 252 determining that the threshold period of time has passed (e.g., based on detecting expiration of a timer set to the threshold period of time from when the UAI is transmitted). In another example, as described further herein, feedback degrading component 254 can transmit the degraded feedback based on additional detections as well, as described further herein, such as detecting that a received signal is not the assistance response signal.

In one example, in method 400, optionally at Block 408, it can be detected that a different signal, not including the one or more parameters, is received after the threshold period of time and without first receiving the assistance response signal. In an aspect, UAI component 252, e.g., in conjunction with processor(s) 212, memory 216, transceiver 202, communicating component 242, etc., can detect that the different signal not including the one or more parameters (e.g., a signal that is not the assistance response signal) is received after the threshold period of time and without first receiving the assistance response signal. In an example, this signal may include PDSCH or may otherwise not include parameters related to the transmitted UAI, such to indicate that the base station 102 did not receive and/or did not process the UAI transmitted by the UE 104. In this case or otherwise, feedback degrading component 254 can transmit degraded feedback for this different signal, as described further herein.

In this example, in degrading the feedback at Block 408, optionally at Block 410, the feedback transmitted in response to the different signal can be degraded. In an aspect, feedback degrading component 254, e.g., in conjunction with processor(s) 212, memory 216, transceiver 202, communicating component 242, etc., can degrade the feedback transmitted in response to the different signal. Thus, in some examples, feedback degrading component 254 can degrade HARQ feedback transmitted for signals actually received from the base station 102, or in other examples, can transmit degraded feedback without receiving other signals from the base station 102, as described further herein.

In one specific example, in degrading the feedback at Block 406, optionally at Block 412, transmitting HARQ feedback can be refrained from. In an aspect, feedback degrading component 254, e.g., in conjunction with processor(s) 212, memory 216, transceiver 202, communicating component 242, etc., can refrain from transmitting HARQ feedback. For example, based on detecting that the assistance response signal is not received from the base station 102, feedback degrading component 254 can refrain from transmitting the HARQ feedback at least for a period of time. In one example, UAI component 252 can determine that the assistance response signal is not received within a threshold time period from sending the UAI, after which feedback degrading component 254 can refrain from transmitting the HARQ feedback for other signals that may be received from the base station 102 (e.g., the different signal detected at Block 408) until after the assistance response signal is received from the base station 102. In another example, feedback degrading component 254 can refrain from transmitting the HARQ feedback for other signals that may be received from the base station 102 until the base station 102 has sent a number of retransmissions of another signal (e.g., a maximum number of retransmissions before dropping the other signal).

Figure 5:
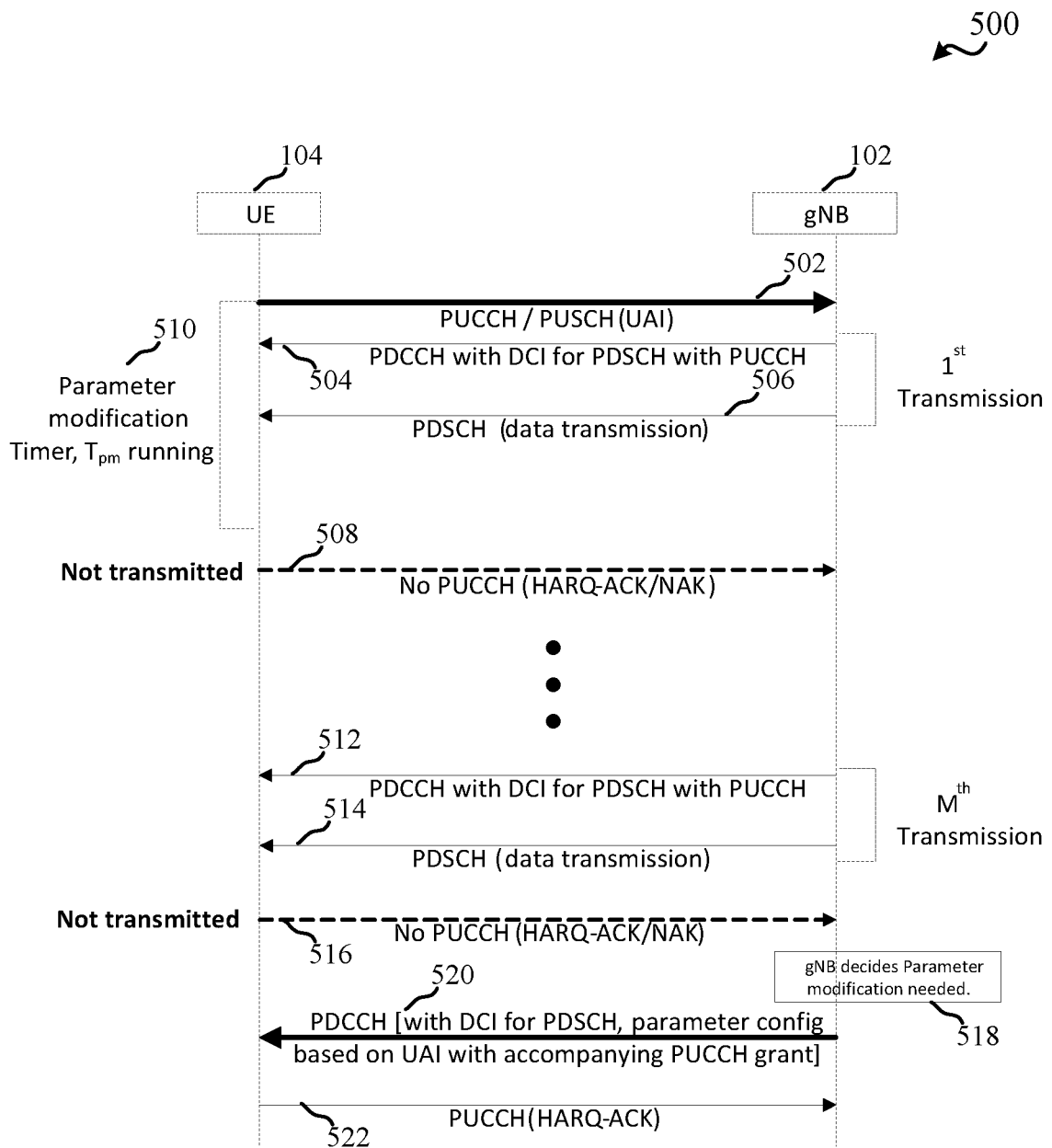
FIG. 5 illustrates an example of a system for refraining from transmitting feedback, in accordance with various aspects of the present disclosure.

An example is shown in FIG. 5, which illustrates an example of a system 500 for refraining from transmitting HARQ feedback where it is determined that an assistance response signal is not received before receiving other signals that are not assistance response signals. System 500 includes a UE 104 communicating with a gNB 102. The UE 104 can send UAI 502 to the gNB 102, which may include sending over a control channel (e.g., physical uplink control channel (PUCCH)), data channel (e.g., physical uplink shared channel (PUSCH)), etc. gNB 102 can receive the UAI 502, but may not be obligated to modify communication parameters based on the UAI, as described. In the depicted example, gNB 102 sends another signal 504, which is not an assistance response signal, to the UE 104 (e.g., without first transmitting an assistance response signal), where the other signal may be transmitted over a control channel (e.g., physical downlink control channel (PDCCH)) including downlink control information (DCI) for a downlink shared channel (e.g., physical downlink shared channel (PDSCH)) with PUCCH. gNB 102 may also begin transmitting data signals 506 (e.g., PDSCH signals) to the UE 104.

In an example, the UE 104 can determine that the signals 504/506 are not assistance response signals and may refrain from transmitting HARQ feedback at 508 over a PUCCH (e.g., HARQ feedback for the PDCCH and/or PDSCH transmissions received at 504 and/or 506). In one example, UE 104 can set a parameter modification timer 510 based on transmitting the UAI, which can allow for a period of time for receiving an assistance response signal. In this example, determining to refrain from transmitting HARQ feedback at 508 may be based on this parameter modification timer 510. In one example, determining to refrain from transmitting the HARQ feedback 508 may be based on determining that the parameter modification timer 510 has expired. Thus, in this example, UE 104 can also receive PDCCH with DCI for PDSCH with PUCCH signal 512 and PDSCH data signal 514, and can accordingly refrain from transmitting HARQ feedback for these additional signals 512/514 at 516 (e.g., based on the parameter modification timer 510 being expired). In another example, the UE 104 can refrain from transmitting HARQ feedback based on detecting other signals 504/506 until the parameter modification timer 510 (or a different timer) expires.

In any case, for example, the gNB 102 can decide that parameter modification may be needed at 518, which can be based on the gNB 102 transmitting M number of transmissions of the signals 504/506, 512/514 without receiving feedback from the UE 104, as the UE 104 has degraded the feedback process. In this example, gNB 102 can transmit the assistance response signal 520 as a PDCCH (with DCI for PDSCH, parameter configuration based on UAI with accompanying PUCCH grant). Based on receiving the assistance response signal 520, the UE 104 can transmit normal (e.g., non-degraded) feedback signal 522 (e.g., HARQ acknowledgement (ACK)) to the gNB 102.

In FIG. 5, for example, scenarios where the UE is dire need of resources (e.g. power) can be represented. In this example, if after certain duration and the UE does not receive modified configurations (e.g., assistance response signals), the UE chooses not send any feedback to the network even though there are pending UE measurement reports (e.g. CSI-RS report) or HARQ ACK/NACK feedback. FIG. 5 shows how the UE does not transmit the HARQ ACK/NACK for a number of control and data transmissions. The UE may also stop reception/decoding of data packets during this period to save power. In addition, the UE may also cease monitoring of control packets only or may even decreased control channel monitoring with modified periodicity. Based on the observations of these actions from the UE, the gNB may decide, after a number of transmissions (or maximum number of transmissions) without any HARQ-ACK.NACK feedback, to send the modified parameters. After that, the UE can respond back with a valid ACK assuming correct detection and "good" channel conditions.

In one specific example, in degrading the feedback at Block 406, optionally at Block 414, NACK feedback can be transmitted. In an aspect, feedback degrading component 254, e.g., in conjunction with processor(s) 212, memory 216, transceiver 202, communicating component 242, etc., can transmit NACK feedback. For example, based on detecting that another signal other than the assistance response signal is received from the base station 102, feedback degrading component 254 can transmit NACK feedback for the other signal, though the signal may have been properly received and/or decoded by the UE 104 (e.g., such that the UE 104 would otherwise indicate ACK for the signal). In one example, UAI component 252 can determine that the signal received after sending UAI (or a signal received after a timer related to transmitting the UAI is expired) is not the assistance response signal. In response to this determination, for example feedback degrading component 254 can transmit NACK as feedback for other signals that may be received from the base station 102 (e.g., the different signal detected at Block 408) until after the assistance response signal is received from the base station 102, or until the base station 102 has sent a number of retransmissions of another signal (e.g., a maximum number of retransmissions before dropping the other signal).

Figure 6:
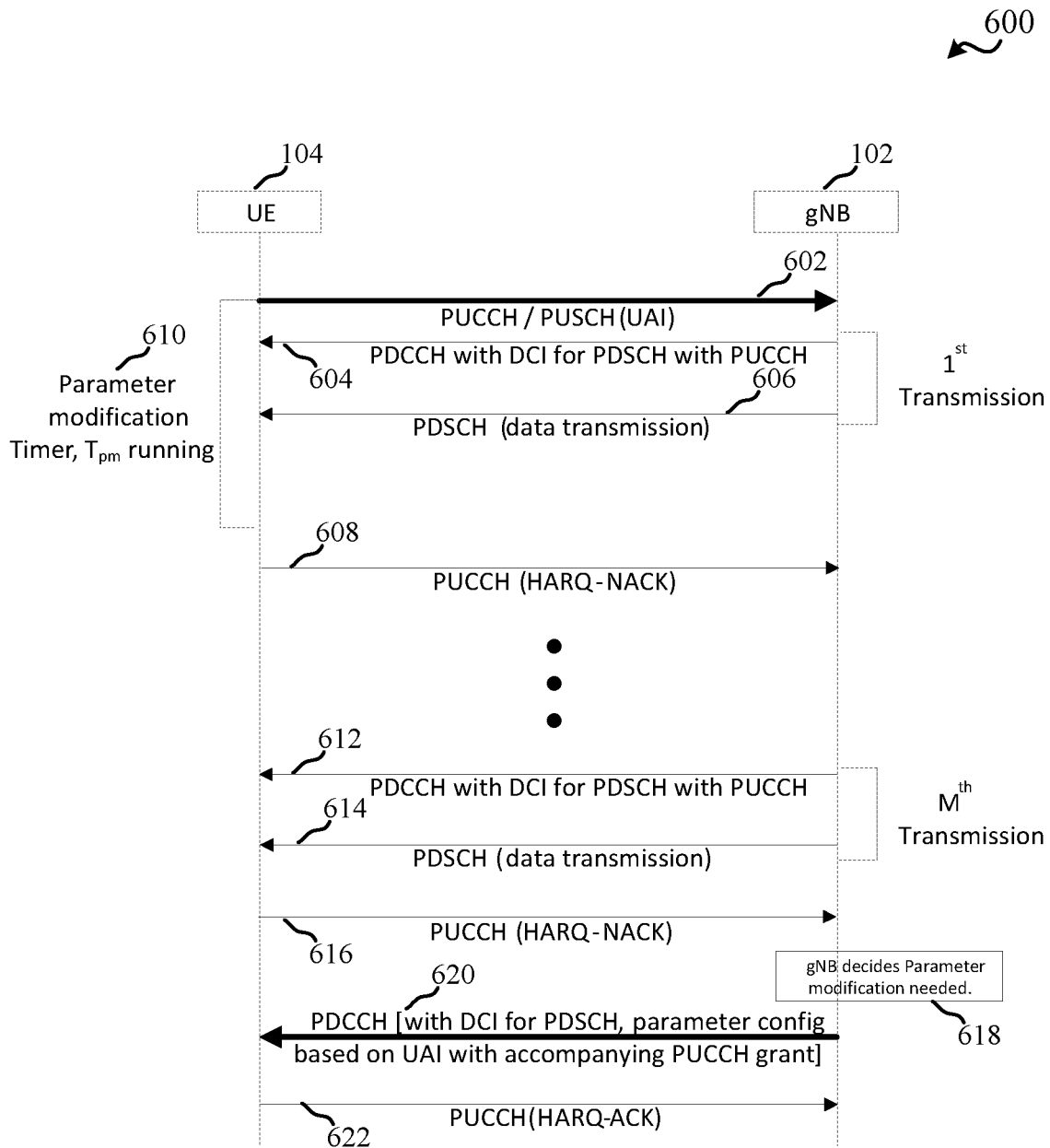
FIG. 6 illustrates an example of a system for transmitting non-acknowledgement feedback, in accordance with various aspects of the present disclosure.

An example is shown in FIG. 6, which illustrates an example of a system 600 for transmitting HARQ NACK feedback where it is determined that an assistance response signal is not received before receiving other signals that are not assistance response signals. System 600 includes a UE 104 communicating with a gNB 102. The UE 104 can send UAI 602 to the gNB 102, which may include sending over a control channel (e.g., PUCCH), data channel (e.g., PUSCH), etc. gNB 102 can receive the UAI 602, but may not be obligated to modify communication parameters based on the UAI, as described. In the depicted example, gNB 102 sends another signal 604, which is not an assistance response signal, to the UE 104, where the other signal may be transmitted over a control channel (e.g., PDCCH) including DCI for a downlink shared channel (e.g., PDSCH) with PUCCH. gNB 102 may also begin transmitting data signals 606 (e.g., PDSCH signals) to the UE 104.

In an example, the UE 104 can determine that the signals 604/606 are not assistance response signals and may transmit NACK feedback at 608 (e.g., over a PUCCH). In one example, UE 104 can set a parameter modification timer 610 based on transmitting the UAI, which can allow for a period of time for receiving an assistance response signal. In this example, determining to transmit HARQ NACK feedback at 608 may be based on this parameter modification timer 610. In one example, determining to transmit the HARQ NACK feedback 608 may be based on determining that the parameter modification timer 610 has expired. Thus, in this example, UE 104 can also receive PDCCH with DCI for PDSCH with PUCCH signal 612 and PDSCH data signal 614, and can accordingly transmit HARQ NACK feedback for these additional signals 612/614 at 616 (e.g., based on the parameter modification timer 610 being expired). In another example, the UE 104 can transmit HARQ NACK feedback based on detecting other signals 604/606 until the parameter modification timer 610 (or a different timer) expires.

In any case, for example, the gNB 102 can decide that parameter modification may be needed at 618, which can be based on the gNB 102 transmitting M number of transmissions of the signals 604/606, 612/614 and receiving HARQ NACK feedback from the UE 104 for a threshold number of the signals, as the UE 104 has degraded the feedback process. In this example, gNB 102 can transmit the assistance response signal 620 as a PDCCH (with DCI for PDSCH, parameter configuration based on UAI with accompanying PUCCH grant). Based on receiving the assistance response signal 620, the UE 104 can transmit normal (e.g., non-degraded) feedback signal 622 (e.g., HARQ acknowledgement (ACK)) to the gNB 102.

In FIG. 6, for example, instead of the no HARQ-NACK feedback (e.g., as in FIG. 5), the UE could choose to send a NACK for all data transmission until the maximum number of retransmissions for a packet is reached. Reception of multiple NACKs from the UE could trigger the gNB to modify parameters according to the recommended UAI as shown in FIG. 6. The gNB may be triggered in situations where the payload size is small and channel conditions are good and hence a NACK is not expected from the UE. The UE may then respond back with a valid HARQ-ACK after receiving the modified parameters.

In another example, in degrading the feedback at Block 406, optionally at Block 416, other signals with device information can be transmitted. In an aspect, feedback degrading component 254, e.g., in conjunction with processor(s) 212, memory 216, transceiver 202, communicating component 242, etc., can transmit other signals with device information. For example, based on detecting that another signal other than the assistance response signal is received from the base station 102, feedback degrading component 254 can transmit other signals with device information (e.g., along with the NACK feedback for the other signal, after transmitting a certain number of NACK feedbacks without receiving the assistance response signal, etc.). In one example, the other signals may include a sounding reference signal (SRS), scheduling request (SR), an additional UAI signal, a power status signal, and/or the like. Transmitting such a signal, for example, can prevent an out-of-synchronization event from being triggered by the network (e.g., where the UE 104 sends a certain number of consecutive NACKs to the base station 102, as in Block 414). In an example, feedback degrading component 254 may transmit the signals with device information after or based on detecting that the threshold period of time for receiving an assistance response signal has expired or based on detecting that a different signal (e.g., the different signal detected at Block 408) is received before receiving the assistance response signal, etc.

Figure 7:
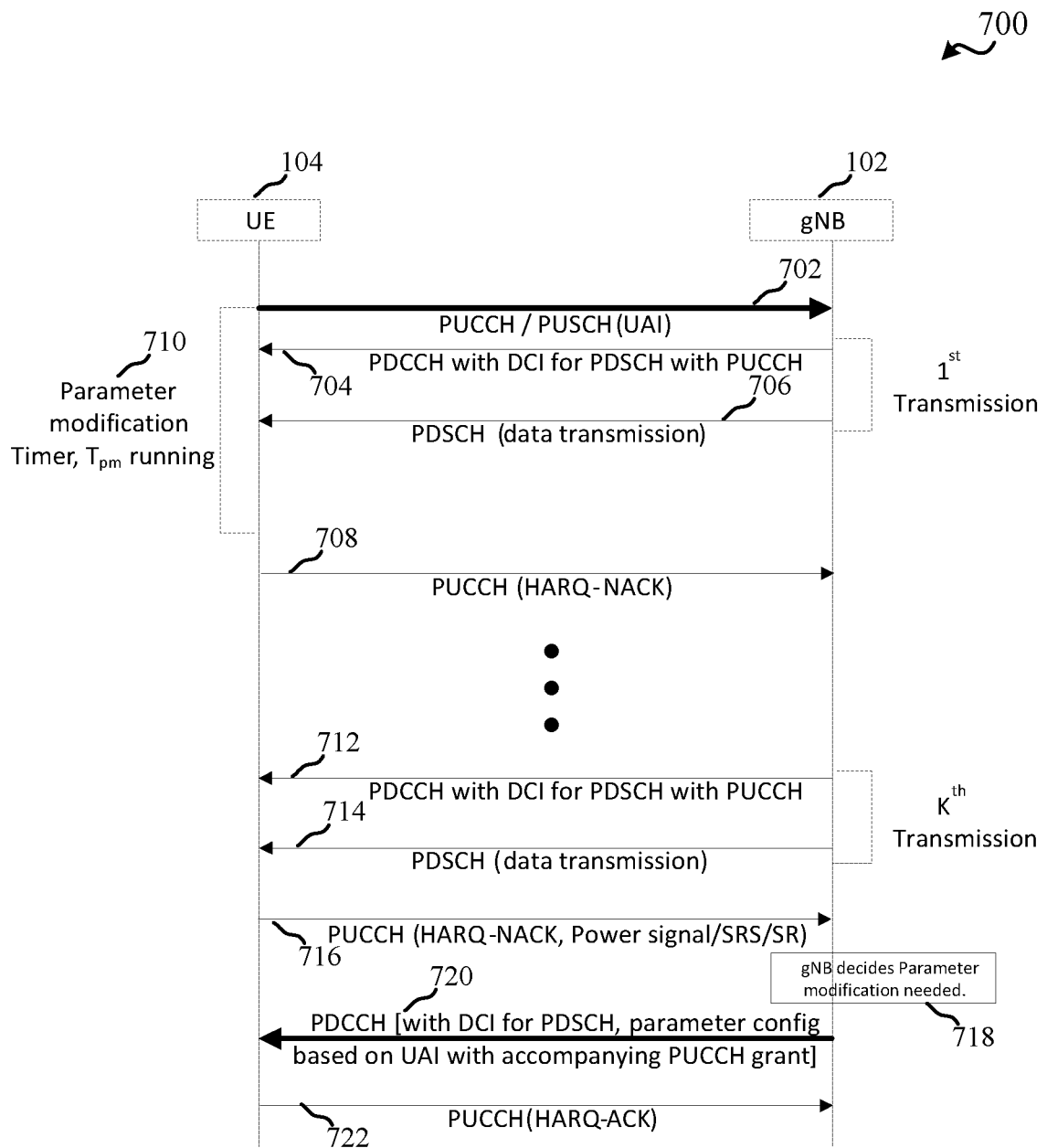
FIG. 7 illustrates an example of a system for transmitting device information signals, in accordance with various aspects of the present disclosure.

An example is shown in FIG. 7, which illustrates an example of a system 700 for transmitting other signals with device information where it is determined that an assistance response signal is not received before receiving other signals that are not assistance response signals. System 700 includes a UE 104 communicating with a gNB 102. The UE 104 can send UAI 702 to the gNB 102, which may include sending over a control channel (e.g., PUCCH), data channel (e.g., PUSCH), etc. gNB 102 can receive the UAI 702, but may not be obligated to modify communication parameters based on the UAI, as described. In the depicted example, gNB 102 sends another signal 704, which is not an assistance response signal, to the UE 104, where the other signal may be transmitted over a control channel (e.g., PDCCH) including DCI for a downlink shared channel (e.g., PDSCH) with PUCCH. gNB 102 may also begin transmitting data signals 706 (e.g., PDSCH signals) to the UE 104.

In an example, the UE 104 can determine that the signals 704/706 are not assistance response signals and may transmit NACK feedback at 708 (e.g., over a PUCCH). In one example, UE 104 can set a parameter modification timer 710 based on transmitting the UAI, which can allow for a period of time for receiving an assistance response signal. In this example, determining to transmit HARQ NACK feedback at 708 may be based on this parameter modification timer 710. In one example, determining to transmit the HARQ NACK feedback 708 may be based on determining that the parameter modification timer 710 has expired. Thus, in this example, UE 104 can also receive PDCCH with DCI for PDSCH with PUCCH signal 612 and PDSCH data signal 714, and can accordingly transmit HARQ NACK feedback for these additional signals 712/714 at 716 (e.g., based on the parameter modification timer 710 being expired). In addition, for example, the UE 104 can transmit (e.g., periodically based on a configured time period for the type of signal or at otherwise determined time instances) the other device information signal(s) (e.g., SRS, SR, UAI, power status signal, etc.), which can allow for avoiding an out-of-synchronization state that may otherwise be caused by transmitting a number of NACKs.

In any case, for example, the gNB 102 can decide that parameter modification may be needed at 718, which can be based on the gNB 102 transmitting M number of transmissions of the signals 704/706, 712/714 and receiving HARQ NACK feedback from the UE 104 for a threshold number of the signals, as the UE 104 has degraded the feedback process, and/or may be based on the other device information signals. In this example, gNB 102 can transmit the assistance response signal 720 as a PDCCH (with DCI for PDSCH, parameter configuration based on UAI with accompanying PUCCH grant). Based on receiving the assistance response signal 720, the UE 104 can transmit normal (e.g., non-degraded) feedback signal 722 (e.g., HARQ acknowledgement (ACK)) to the gNB 102.

In FIG. 7, for example, in addition to the UE send NACKs for the data packets (e.g., as in FIG. 6), after some transmissions, N, of the packet, the UE can send some info on the uplink inform of SRS, SR, UAI, power status signal. This signal can prevent the "out-of-synch" from being triggered. This signal could be used to send UAI re-transmission and/or to otherwise remind the gNB of the previously transmitted UAI. After the receiving such a signal and the NACKs for previously transmitted PDSCHs, the gNB may respond modifying the parameters are recommended in the UAI. Note that there may be cases where there is no uplink grant and the UE can send a RACH to access the network to trigger the modification of parameters by the gNB.

In another example, in transmitting the other signals at Block 416, communicating component 242 can transmit a RACH request to the base station 102, which can be based on not receiving the assistance response signal within a period of time (e.g., before expiration of a parameter modification timer described above). For example, the RACH request can allow the base station 102 to determine to obtain a UAI configuration after one or more RACH transmissions by the UE, and the base station 102 can accordingly obtain the previously transmitted UAI. In this regard, the base station 102 can accordingly send an assistance response signal to the UE 104 based on applying the UAI as part of the RACH process, and the UE 104 can receive the assistance response signal, e.g., as described in reference to Block 422 below.

In one specific example, in degrading the feedback at Block 406, optionally at Block 418, transmitting CQI reports can be refrained from, or at Block 420, CQI reports can be transmitted with degraded CQI values. In an aspect, feedback degrading component 254, e.g., in conjunction with processor(s) 212, memory 216, transceiver 202, communicating component 242, etc., can refrain from transmitting CQI reports or can transmit CQI reports with degraded values. For example, based on detecting that the assistance response signal is not received from the base station 102, feedback degrading component 254 can refrain from transmitting the CQI reports or can transmit CQI reports with degraded CQI values (e.g., nominal CQI values, CQI values that are less than those measured for channel state information (CSI) reference signals (RS), values configured to be used to indicate that assistance response signals are not received, etc.) at least for a period of time. In one example, UAI component 252 can determine that the assistance response signal is not received within a threshold time period from sending the UAI, after which feedback degrading component 254 can refrain from transmitting the CQI reports or can transmit degraded CQI reports until after the assistance response signal is received from the base station 102. In another example, UAI component 252 can determine that different signals (other than assistance response signals) are received, and may refrain from transmitting the CQI reports, or may transmit degraded CQI reports, based on receiving the different signals.

Figure 8:
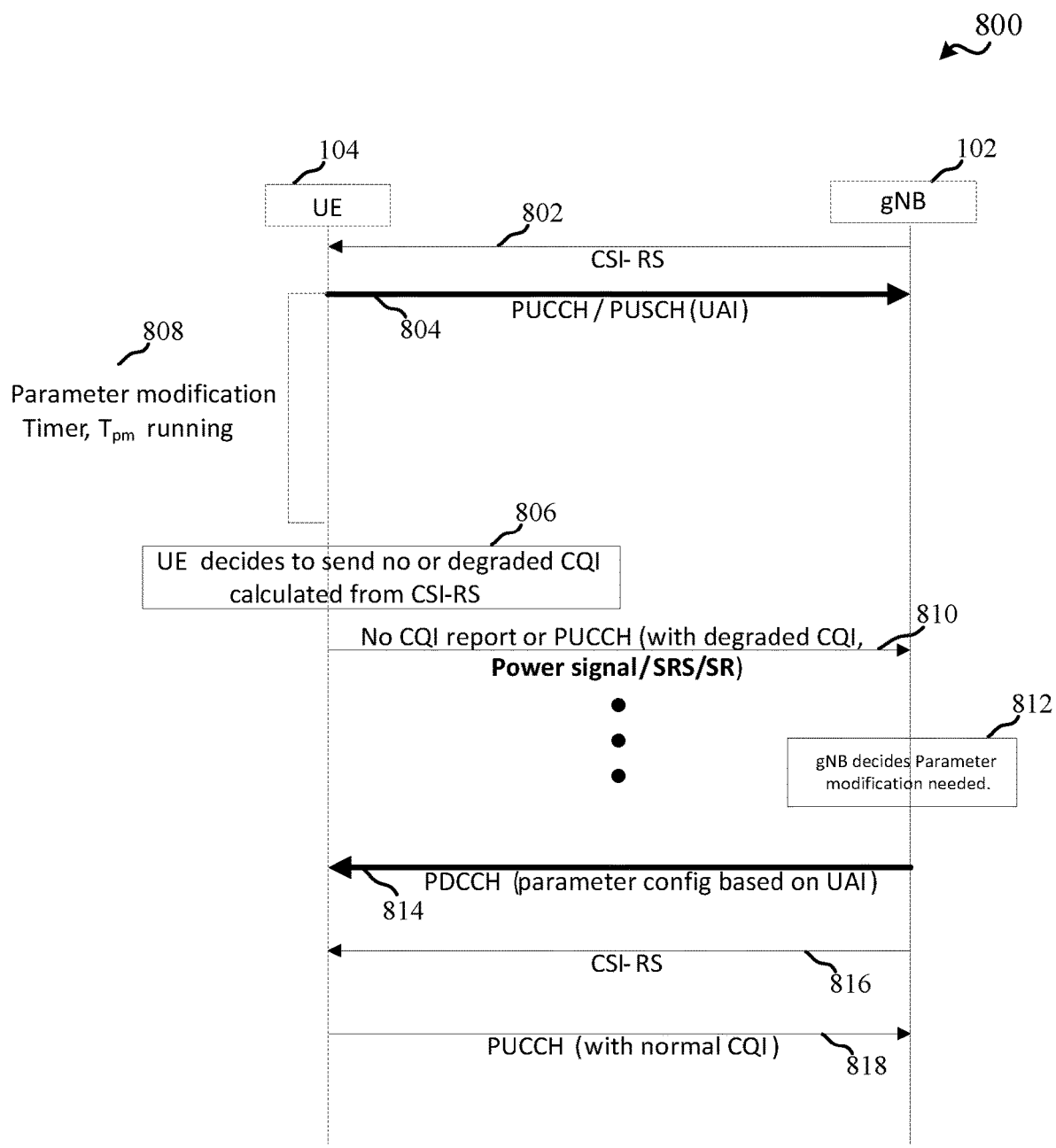
FIG. 8 illustrates an example of a system for refraining from transmitting channel quality indicator (CQI) reports or transmitting degraded CQI values, in accordance with various aspects of the present disclosure.

An example is shown in FIG. 8, which illustrates an example of a system 800 for refraining from transmitting CQI reports or for transmitting degraded CQI reports where it is determined that an assistance response signal is not received from the base station 102 before the scheduled CQI report is to be transmitted. System 800 includes a UE 104 communicating with a gNB 102. The gNB 102 can send a CSI-RS 802 to the UE 104 for generating a CQI report. The UE 104 can send UAI 804 to the gNB 102, which may include sending over a control channel (e.g., PUCCH), data channel (e.g., PUSCH), etc. gNB 102 can receive the UAI 804, but may not be obligated to modify communication parameters based on the UAI, as described. In the depicted example, the UE can decide to send no CQI or a degraded CQI report to the gNB 102 at 806 and may do so at 808, which can be based on determining that the assistance response signal is not received before the CQI reporting opportunity based on CSI-RS 802. In addition, in an example, the UE 104 can send other device information signals to the gNB 102 at 808 (e.g., SRS, SR, UAI, power status signal, etc.) to prevent out-of-synchronization state that may be otherwise caused by not sending CQI reports, or low CQI reports, in reporting opportunities.

In any case, after not receiving CQI reports or receiving a number of degraded CQI reports, for example, the gNB 102 can decide that parameter modification may be needed at 812. In this example, gNB 102 can transmit the assistance response signal 814 as a PDCCH (with DCI for PDSCH, parameter configuration based on UAI with accompanying PUCCH grant). In addition, the gNB 102 can send another CSI-RS 816 to the UE 104. Based on receiving the assistance response signal 814 and the CSI-RS 816, the UE 104 can transmit normal (e.g., non-degraded) CQI report 818 to the gNB 102.

In FIG. 8, for example, it can be assumed that the gNB had configured CQI reports based on previously transmitted CSI-RS. However, since the UE did not receive a response to the UAI after a period of time (e.g., defined by the parameter modification timer), the UE sends no CQI or degraded CQI to the gNB. With no CQI, the gNB might not be able to schedule any PDSCH to the UE. With degraded CQI, the gNB is only able to limited DL data to the UE. The UE can send some info on the uplink inform of SRS, SR, UAI, power status signal in this example as well to prevent the "out-of-synch" from being triggered. This signal could be used to send UAI re-transmission and/or to otherwise remind the gNB of the previously transmitted UAI.

In the examples of FIGS. 5-8, the UE 104 can eventually receive the assistance response signal from the base station 102 based on degrading the feedback using one or more of the processes described above. In method 400, optionally at Block 422, the assistance response signal can be received from the base station. In an aspect, UAI component 252, e.g., in conjunction with processor(s) 212, memory 216, transceiver 202, communicating component 242, etc., can receive the assistance response signal from the base station (e.g., after degrading the feedback). As described, the assistance response signal can include an indication that one or more parameters are adjusted (or can be adjusted where the parameter is configured by the UE 104), an indication of one or more parameters to adjust as part of communicating with the base station 102, one or more values for adjusting the one or more parameters, etc., which can be based on the UAI.

In method 400, optionally at Block 424, one or more communication parameters can be applied from the assistance response signal. In an aspect, UAI component 252, e.g., in conjunction with processor(s) 212, memory 216, transceiver 202, communicating component 242, etc., can apply the one or more parameters from the assistance response signal. As described, this can include adjusting values of the one or more parameters described above, such as a number of antennas over which to communicate with the base station 102 or other base stations, adjusting one or more DRX parameters, adjusting parameters for receiving PDCCH, and/or the like. In addition, feedback degrading component 254 can refrain from degrading feedback at least until a next UAI is sent and a corresponding assistance response signal is not received.

In method 400, optionally at Block 426, non-degraded feedback can be transmitted. In an aspect, communicating component 242, e.g., in conjunction with processor(s) 212, memory 216, transceiver 202, etc., can transmit the non-degraded feedback. In this regard, based on receiving the assistance response signal from the base station and/or based modifying associated communication parameters (or communicating based on modified communication parameters), communicating component 242 can return to using a normal non-degraded feedback process to transmit normal feedback (e.g., HARQ, CQI reports, etc.) to the base station 102, and may do so at least until another instance where an assistance response signal is not received for a transmitted UAI.

Figure 9:
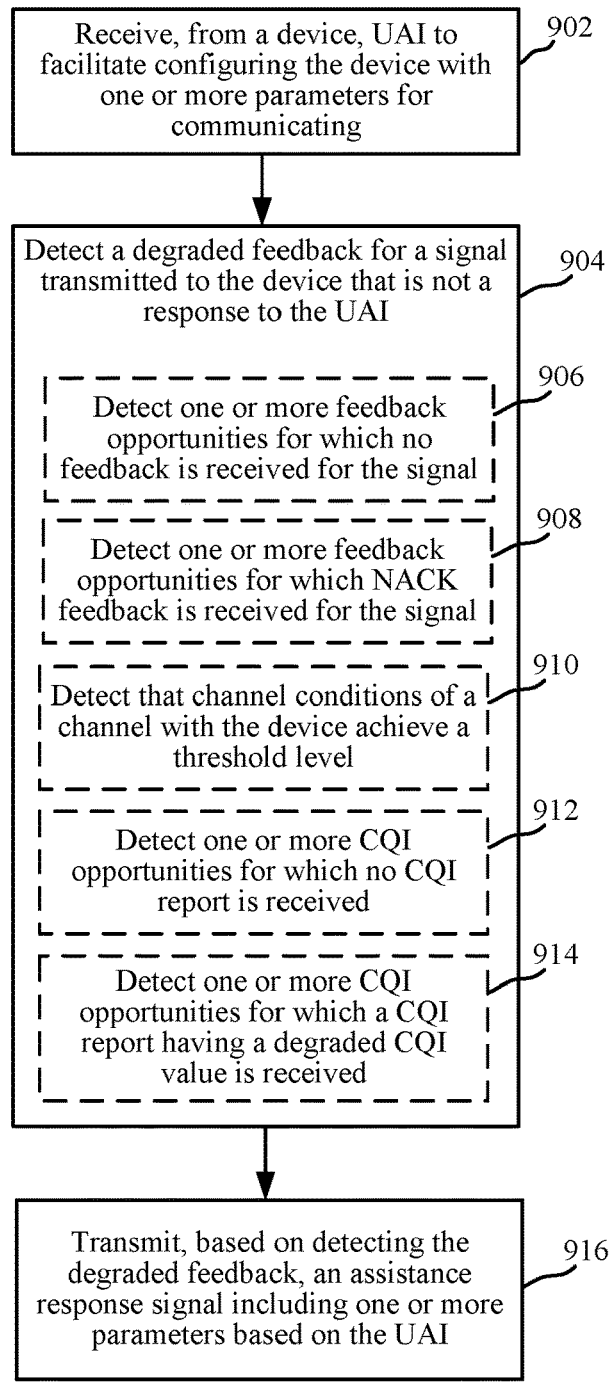
FIG. 9 is a flow chart illustrating an example of a method for sending assistance response signals, in accordance with various aspects of the present disclosure.

FIG. 9 illustrates a flow chart of an example of a method 900 for transmitting assistance response signals in response to receiving UAI and/or degraded feedback. In an example, a base station 102 (e.g., which may include a gNB 180) can perform the functions described in method 900 using one or more of the components described in FIGS. 1 and 3.

In method 900, at Block 902, UAI can be received, from a device, to facilitate configuring the device with one or more parameters for communicating. In an aspect, parameter configuring component 352, e.g., in conjunction with processor(s) 312, memory 316, transceiver 302, scheduling component 342 etc., can receive, from the device (e.g., UE 104), UAI to facilitate configuring the device with one or more parameters (e.g., configuring one or more parameters for use by the device) for communicating (e.g., with base station 102 and/or other base stations in the network). As described, for example, the one or more parameters can include a number of antennas, DRX parameters, PDCCH monitoring parameters, etc., as described. Moreover, as described, parameter configuring component 352 can receive the UAI as part of a RACH procedure, in a control communication over an established control channel, etc.

In method 900, at Block 904, a degraded feedback can be detected for a signal transmitted to the device that is not a response to the UAI. In an aspect, feedback processing component 354, e.g., in conjunction with processor(s) 312, memory 316, transceiver 302, scheduling component 342 etc., can detect the degraded feedback for the signal transmitted to the device that is not a response to the UAI. In an example, feedback processing component 354 can determine that the signal transmitted to the device is not a response to the UAI based on determining that the signal is not an assistance response signal or otherwise does not include indicate that parameters in UAI are applied and/or does not include the one or more parameters and/or values thereof. For example, feedback processing component 354 can have transmitted a data signal, CSI-RS, or other signal to the device that is not an assistance response signal to the UE 104, and can accordingly receive degraded feedback (e.g., a degraded feedback value or no feedback, as described above) from the UE.

For example, in detecting degraded feedback at Block 904, optionally at Block 906, one or more feedback opportunities for which no feedback is received for the signal can be detected. In an aspect, feedback processing component 354, e.g., in conjunction with processor(s) 312, memory 316, transceiver 302, scheduling component 342 etc., can detect the one or more feedback opportunities for which no feedback is received for the signal. For example, scheduling component 342 can transmit the other signal, which is not an assistance response signal, and can retransmit the signal where no feedback is received from the UE 104. After detecting one or more feedback opportunities without detecting HARQ feedback, however, feedback processing component 354 can determine that the feedback is being degraded. This is additionally described with reference to FIG. 5, above.

For example, in detecting degraded feedback at Block 904, optionally at Block 908, one or more feedback opportunities for which NACK feedback is received for the signal can be detected. In an aspect, feedback processing component 354, e.g., in conjunction with processor(s) 312, memory 316, transceiver 302, scheduling component 342 etc., can detect the one or more feedback opportunities for which NACK feedback is received for the signal. For example, scheduling component 342 can transmit the other signal, which is not an assistance response signal, and can retransmit the signal where NACK feedback is received from the UE 104. After detecting one or more feedback opportunities with HARQ NACK feedback, however, feedback processing component 354 can determine that the feedback is being degraded. This is additionally described with reference to FIG. 6, above.

For example, in detecting degraded feedback at Block 904, optionally at Block 910, it can be detected that channel conditions of a channel with the device achieve a threshold level. In an aspect, feedback processing component 354, e.g., in conjunction with processor(s) 312, memory 316, transceiver 302, scheduling component 342 etc., can detect that the channel conditions of the channel with the device achieve the threshold level. For example, feedback processing component 354 can use this determination in conjunction with detecting certain feedback (e.g., in conjunction with detecting feedback opportunities with no feedback or detecting multiple NACK feedback) to determine the feedback is indeed degraded (e.g., where channel conditions are good), as described above.

For example, in detecting degraded feedback at Block 904, optionally at Block 912, one or more CQI opportunities for which no CQI report is received for the signal can be detected, or at Block 914, one or more CQI opportunities for which a CQI report having a degraded CQI value is received can be detected. In an aspect, feedback processing component 354, e.g., in conjunction with processor(s) 312, memory 316, transceiver 302, scheduling component 342 etc., can detect the one or more CQI opportunities for which no CQI report is received for the signal or can detect the one or more CQI opportunities for which a CQI report having a degraded CQI value is received. For example, scheduling component 342 can transmit CSI-RS and can detect that no CQI is being received, or degraded CQI is being received, from the UE 104 in associated reporting opportunities. After detecting one or more CQI opportunities without detecting a CQI report or detecting a degraded CQI report, however, feedback processing component 354 can determine that the feedback is being degraded. This is additionally described with reference to FIG. 8, above.

In method 900, at Block 916, an assistance response signal including one or more parameters based on the UAI can be transmitted based on detecting the degraded feedback. In an aspect, scheduling component 342, e.g., in conjunction with processor(s) 312, memory 316, transceiver 302, etc., can transmit, based on detecting the degraded feedback, the assistance response signal including the one or more parameters based on the UAI. As described, for example, the one or more parameters may specify, to the UE 104, a number of antennas to use in communicating with the base station 102, one or more DRX parameters, one or more PDCCH monitoring parameters, and/or the like. In this regard, the base station 102 can be influenced or caused to modify communication parameters for the UE 104 in view of the received UAI.

Figure 10:
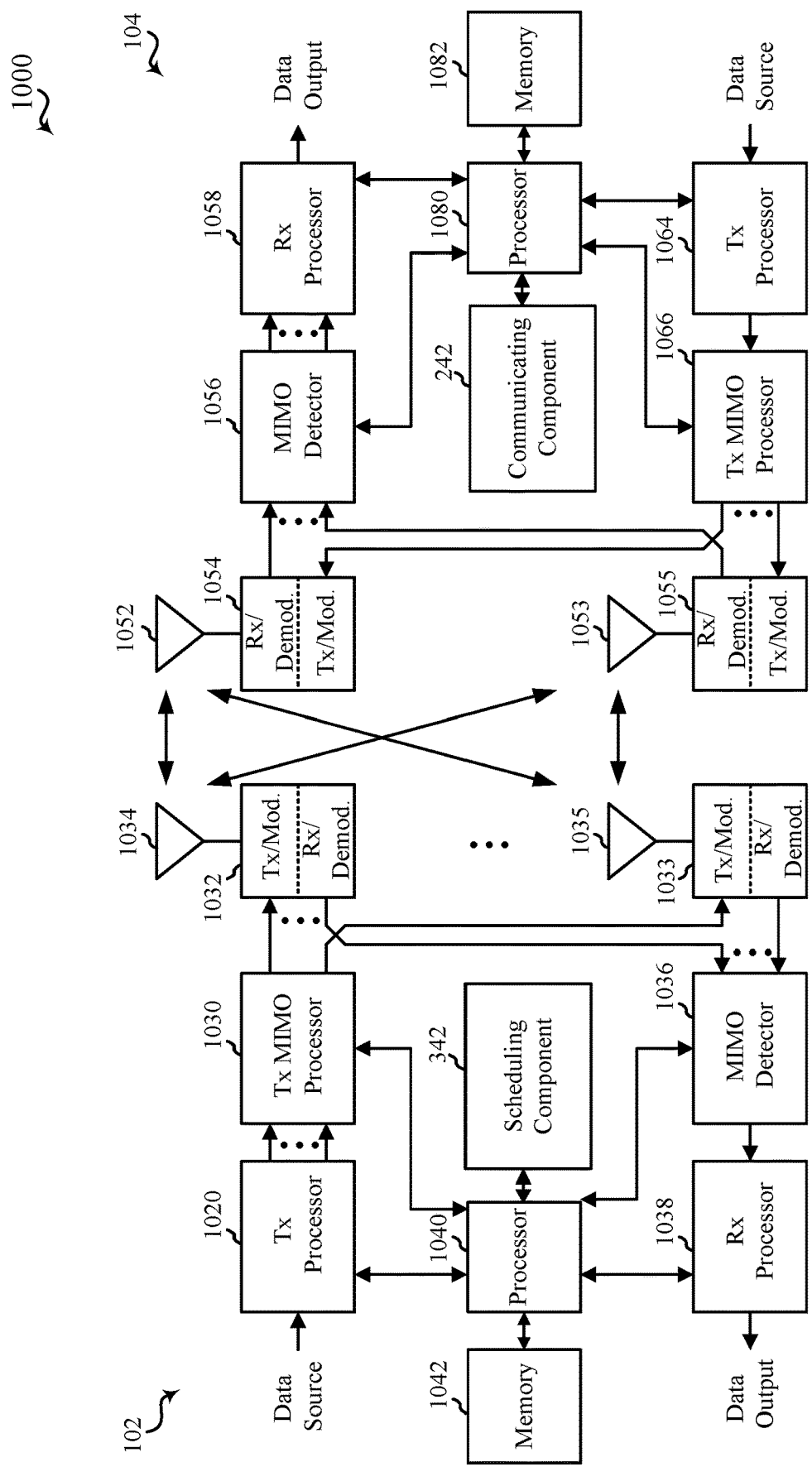
FIG. 10 is a block diagram illustrating an example of a MIMO communication system including a base station and a UE, in accordance with various aspects of the present disclosure.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1-2. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a communicating component 242 (see e.g., FIGS. 1 and 2).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1000.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communications, comprising:
   transmitting, by a device and to a base station, assistance information to facilitate configuring one or more parameters for communicating with the base station;
   detecting, by the device, that an assistance response signal including the one or more parameters based on the assistance information is not received from the base station within a threshold period of time; and
   degrading, by the device and based on the detecting that the assistance response signal is not received within the threshold period of time, feedback to be communicated to the base station.
2. The method of example 1, wherein detecting that the assistance response signal is not received further comprises detecting, by the device, that a different signal not including the one or more parameters is received after the threshold period of time and without first receiving the assistance response signal, and wherein degrading the feedback comprises degrading the feedback to be communicated to the base station for the different signal.
3. The method of any of examples 1 or 2, wherein degrading the feedback comprises refraining from transmitting the feedback in one or more feedback transmission opportunities.
4. The method of example 3, wherein refraining from transmitting the feedback comprises refraining from transmitting the feedback at least until the assistance response signal is received or until a maximum number of retransmissions is reached.
5. The method of any of examples 3 or 4, further comprising refraining, based on detecting that the assistance response signal is not received, from decoding data packets in the different signal.
6. The method of example 5, wherein refraining from decoding the data packets is based on determining that the assistance information is not received from the base station within the threshold period of time.
7. The method of any of examples 2 to 6, wherein degrading the feedback comprises transmitting negative acknowledgement (NACK) feedback for the different signal.
8. The method of example 7, wherein transmitting the NACK feedback comprises transmitting the NACK feedback at least until the assistance response signal is received or until a maximum number of retransmissions is reached.
9. The method of any of examples 2 to 8, wherein degrading the feedback comprises, after transmitting negative acknowledgement (NACK) feedback for the different signal a threshold number of times, transmitting one or more of a sounding reference signal (SRS), a scheduling request (SR), the assistance information, or a power status signal.
10. The method of example 9, wherein transmitting the NACK feedback comprises transmitting the NACK feedback and/or transmitting the one or more of the SRS, the SR, the assistance information, or the power status signal, at least until the assistance response signal is received or until a maximum number of retransmissions is reached.
11. The method of any of examples 1 to 10, wherein degrading the feedback comprises refraining from transmitting a channel quality indicator (CQI) report configured by the base station at least until the assistance response signal is received.
12. The method of any of examples 1 to 11, wherein degrading the feedback comprises transmitting, to the base station, a channel quality indicator (CQI) report based on a channel state information reference signal (CSI-RS) received from the base station and having a degraded CQI value at least until the assistance response signal is received.
13. The method of example 12, further comprising transmitting, after transmitting a number of degraded CQI reports, one or more of a sounding reference signal (SRS), a scheduling request (SR), the assistance information, or a power status signal.
14. The method of any of examples 1 to 13, wherein the feedback is one of hybrid automatic repeat/request (HARQ) feedback for a received shared channel signal or a pilot signal with a channel state information (CSI) report.

15. The method of any of examples 1 to 14, wherein the assistance information includes one or more of a number of antennas, a discontinuous receive (DRX) parameter, or a control channel monitoring parameter.

16. A method for wireless communications, comprising:
receiving, by a base station and from a device, assistance information to facilitate configuring one or more parameters for communicating with the base station;
detecting, by the base station, a degraded feedback for a signal transmitted to the device that does not include the one or more parameters based on the assistance information; and
transmitting, to the device and based on detecting the degraded feedback, an assistance response signal including one or more parameters based on the assistance information.

17. The method of example 16, wherein detecting the degraded feedback comprises detecting one or more feedback opportunities for which no feedback is received for the signal.

18. The method of any of examples 16 or 17, wherein detecting the degraded feedback comprises receiving, in one or more feedback opportunities, negative acknowledgement (NACK) feedback for the signal.

19. The method of example 18, wherein detecting the degraded feedback further comprises detecting that channel conditions of a channel with the device achieve a threshold level.

20. The method of any of examples 16 to 19, wherein detecting the degraded feedback comprises detecting one or more channel quality indicator (CQI) reporting opportunities for which no CQI report is received from the device.

21. The method of any of examples 16 to 20, wherein detecting the degraded feedback comprises receiving, in one or more channel quality indicator (CQI) reporting opportunities, a channel quality indicator (CQI) report based on a channel state information reference signal (CSI-RS) transmitted by the base station as having a degraded CQI value.

22. The method of any of examples 16 to 21, wherein the assistance information includes one or more of a number of antennas, a discontinuous receive (DRX) parameter, or a control channel monitoring parameter, and further comprising modifying the one or more parameters based on the assistance information.

23. An apparatus for wireless communication, comprising:
a transceiver;
a memory configured to store instructions; and
one or more processors communicatively coupled with the transceiver and the memory, wherein the one or more processors are configured to:
transmit, to a base station, assistance information to facilitate configuring one or more parameters for communicating with the base station;
detect that an assistance response signal including the one or more parameters based on the assistance information is not received from the base station within a threshold period of time; and
degrade, based on the detecting that the assistance response signal is not received within the threshold period of time, feedback to be communicated to the base station.

24. The apparatus of example 23, wherein the one or more processors are configured to detect that the assistance response signal is not received at least in part by further detecting that a different signal not including the one or more parameters is received after the threshold period of time and without first receiving the assistance response signal, and wherein the one or more processors are configured to degrade the feedback to be communicated to the base station for the different signal.

25. The apparatus of example 24, wherein the at least one processor is configured to degrade the feedback at least in part by refraining from transmitting the feedback in one or more feedback transmission opportunities.

26. The apparatus of any of examples 24 to 25, wherein the at least one processor is configured to degrade the feedback at least in part by transmitting negative acknowledgement (NACK) feedback for the other signal.

27. The apparatus of any of examples 24 to 26, wherein the at least one processor is configured to degrade the feedback at least in part by, after transmitting negative acknowledgement (NACK) feedback for the other signal a threshold number of times, transmitting one or more of a sounding reference signal (SRS), a scheduling request (SR), the assistance information, or a power status signal.

28. The apparatus of any of examples 23 to 27, wherein the at least one processor is configured to degrade the feedback at least in part by refraining from transmitting a channel quality indicator (CQI) report configured by the base station at least until the assistance response signal is received.

29. The apparatus of any of examples 23 to 28, wherein the at least one processor is configured to degrade the feedback at least part by transmitting, to the base station, a channel quality indicator (CQI) report based on a channel state information reference signal (CSI-RS) received from the base station and having a degraded CQI value at least until the assistance response signal is received.

30. An apparatus for wireless communication, comprising:
a transceiver;
a memory configured to store instructions; and
one or more processors communicatively coupled with the transceiver and the memory, wherein the one or more processors are configured to:
receive, from a device, assistance information to facilitate configuring one or more parameters for communicating with the apparatus;
detect a degraded feedback for a signal transmitted to the device that does not include the one or more parameters based on the assistance information; and
transmit, to the device and based on detecting the degraded feedback, an assistance response signal including one or more parameters based on the assistance information.

What is claimed is:

1. A method for wireless communications, comprising:
receiving, by a base station and from a device, assistance information to facilitate configuring, for the device and by the base station, one or more parameters for the device to use in communicating with the base station;
transmitting, by the base station and to the device and after a threshold period of time for transmitting an assistance response signal in response to the assistance information, a signal that is different from the assistance response signal and does not include the one or more parameters that are based on the assistance information;

detecting, by the base station, a degraded feedback received from the device for the signal transmitted to the device that is different from the assistance response signal and does not include the one or more parameters that are based on the assistance information; and transmitting, by the base station and to the device and based on detecting the degraded feedback, the assistance response signal including one or more parameters that are based on the assistance information.

2. The method of claim 1, wherein detecting the degraded feedback comprises detecting one or more feedback opportunities for which no feedback is received for the signal.

3. The method of claim 1, wherein detecting the degraded feedback comprises receiving, in one or more feedback opportunities, negative acknowledgement (NACK) feedback for the signal.

4. The method of claim 3, wherein detecting the degraded feedback further comprises detecting that channel conditions of a channel with the device achieve a threshold level.

5. The method of claim 1, wherein detecting the degraded feedback comprises detecting one or more channel quality indicator (CQI) reporting opportunities for which no CQI report is received from the device.

6. The method of claim 1, wherein the signal is a channel state information reference signal (CSI-RS) transmitted by the base station, and wherein detecting the degraded feedback comprises receiving, in one or more channel quality indicator (CQI) reporting opportunities, a channel quality indicator (CQI) report based on the CSI-RS as having a degraded CQI value.

7. The method of claim 1, wherein the assistance information includes one or more of a number of antennas, a discontinuous receive (DRX) parameter, or a control channel monitoring parameter, and further comprising modifying, in the assistance response signal, the one or more parameters based on the assistance information.

8. An apparatus for wireless communication, comprising:
a transceiver;
a non-transitory memory configured to store instructions; and
one or more processors communicatively coupled with the transceiver and the non-transitory memory, wherein the one or more processors are configured to:
receive, from a device, assistance information to facilitate configuring, for the device and by the apparatus, one or more parameters for the device to use in communicating with the apparatus;
transmit, to the device and after a threshold period of time for transmitting an assistance response signal in response to the assistance information, a signal that is different from the assistance response signal and does not include the one or more parameters that are based on the assistance information;
detect a degraded feedback received from the device for the signal transmitted to the device that is different from the assistance response signal and does not include the one or more parameters that are based on the assistance information; and
transmit, to the device and based on detecting the degraded feedback, the assistance response signal including one or more parameters that are based on the assistance information.

9. The apparatus of claim 8, wherein the one or more processors are configured to detect the degraded feedback at least in part by detecting one or more feedback opportunities for which no feedback is received for the signal.

10. The apparatus of claim 8, wherein the one or more processors are configured to detect the degraded feedback at least in part by receiving, in one or more feedback opportunities, negative acknowledgement (NACK) feedback for the signal.

11. The apparatus of claim 10, wherein the one or more processors are configured to detect the degraded feedback at least in part by detecting that channel conditions of a channel with the device achieve a threshold level.

12. The apparatus of claim 8, wherein the one or more processors are configured to detect the degraded feedback at least in part by detecting one or more channel quality indicator (CQI) reporting opportunities for which no CQI report is received from the device.

13. The apparatus of claim 8, wherein the signal is a channel state information reference signal (CSI-RS) transmitted by the apparatus, and wherein the one or more processors are configured to detect the degraded feedback at least in part by receiving, in one or more channel quality indicator (CQI) reporting opportunities, a channel quality indicator (CQI) report based on the CSI-RS as having a degraded CQI value.

14. The apparatus of claim 8, wherein the assistance information includes one or more of a number of antennas, a discontinuous receive (DRX) parameter, or a control channel monitoring parameter, and wherein the one or more processors are configured to modify, in the assistance response signal, the one or more parameters based on the assistance information.

15. A non-transitory computer-readable medium, comprising code executable by one or more processors for wireless communication, the code comprising code for:
receiving, by a base station and from a device, assistance information to facilitate configuring, for the device and by the base station, one or more parameters for the device to use in communicating with the base station;
transmitting, by the base station and to the device and after a threshold period of time for transmitting an assistance response signal in response to the assistance information, a signal that is different from the assistance response signal and does not include the one or more parameters that are based on the assistance information;
detecting, by the base station, a degraded feedback received from the device for the signal transmitted to the device that is different from the assistance response signal and does not include the one or more parameters that are based on the assistance information; and
transmitting, by the base station and to the device and based on detecting the degraded feedback, the assistance response signal including one or more parameters that are based on the assistance information.

16. The non-transitory computer-readable medium of claim 15, wherein the code for detecting detects the degraded feedback at least in part by detecting one or more feedback opportunities for which no feedback is received for the signal.

17. The non-transitory computer-readable medium of claim 15, wherein the code for detecting detects the degraded feedback at least in part by receiving, in one or more feedback opportunities, negative acknowledgement (NACK) feedback for the signal.

18. The non-transitory computer-readable medium of claim 17, wherein the code for detecting detects the degraded feedback at least in part by detecting that channel conditions of a channel with the device achieve a threshold level.

19. The non-transitory computer-readable medium of claim 15, wherein the code for detecting detects the degraded feedback at least in part by detecting one or more channel quality indicator (CQI) reporting opportunities for which no CQI report is received from the device.

20. The non-transitory computer-readable medium of claim 15, wherein the signal is a channel state information reference signal (CSI-RS) transmitted by the base station, and wherein code for detecting detects the degraded feedback at least in part by receiving, in one or more channel quality indicator (CQI) reporting opportunities, a channel quality indicator (CQI) report based on the CSI-RS as having a degraded CQI value.

* * * * *